United States Patent [19]
Mooty et al.

[11] Patent Number: 6,161,295
[45] Date of Patent: Dec. 19, 2000

[54] BRAKE MECHANISM FOR COMPUTERIZED GRADE ROD

[76] Inventors: Glenn J. Mooty, 20580 Henwood Dr., San Jose, Calif. 95120; Bruce J. Richardson, 14801 Golf Links Dr., Los Gatos, Calif. 95032

[21] Appl. No.: 09/232,748

[22] Filed: Jan. 15, 1999

[51] Int. Cl.[7] .................................................. G01C 15/06
[52] U.S. Cl. ............................................... 33/294; 33/293
[58] Field of Search ............................... 33/294, 293, 295

[56] References Cited

U.S. PATENT DOCUMENTS

| | | | |
|---|---|---|---|
| 833,880 | 10/1906 | Keuffel | 33/294 |
| 2,017,346 | 10/1935 | Linn | 33/294 |
| 3,105,303 | 10/1963 | Frizzell | 33/294 |
| 5,457,890 | 10/1995 | Mooty | 33/294 |
| 5,566,460 | 10/1996 | Bates | 33/293 |

*Primary Examiner*—Christopher W. Fulton
*Attorney, Agent, or Firm*—Flehr Hohbach Test Albritton & Herbert LLP

[57] ABSTRACT

A brake mechanism for use with a computerized grade rod comprising a housing containing a tunnel adapted to receive the grade rod and having the grade rod extend therethrough. A sensing wheel is mounted on the housing and tangentially engages the outer surface of the grade rod and rotates as the housing ascends and descends the grade rod. A brake assembly is carried by the housing in a predetermined longitudinal position with respect to the grade rod. The brake assembly includes first and second spaced apart brake shoes spaced apart longitudinally of the grade rod. A mounting plate is carried by the housing. First and second arms carry respectively the first and the second brake shoes. Each of the said brake shoes has a center point. First and second spaced apart pivot pins are provided for pivotally mounting the first and second arms. The first and second pivot pins are positioned off center with respect to the center points of the first and second brake shoes. A spring is secured to the first and second arms for yieldably urging the first and second brake shoes into frictional engagement with the grade rod. A handle is mounted on the housing and is coupled to the first and second arms for moving the first and second brake shoes out of engagement with the grade rod against the yieldable force of the spring.

7 Claims, 1 Drawing Sheet

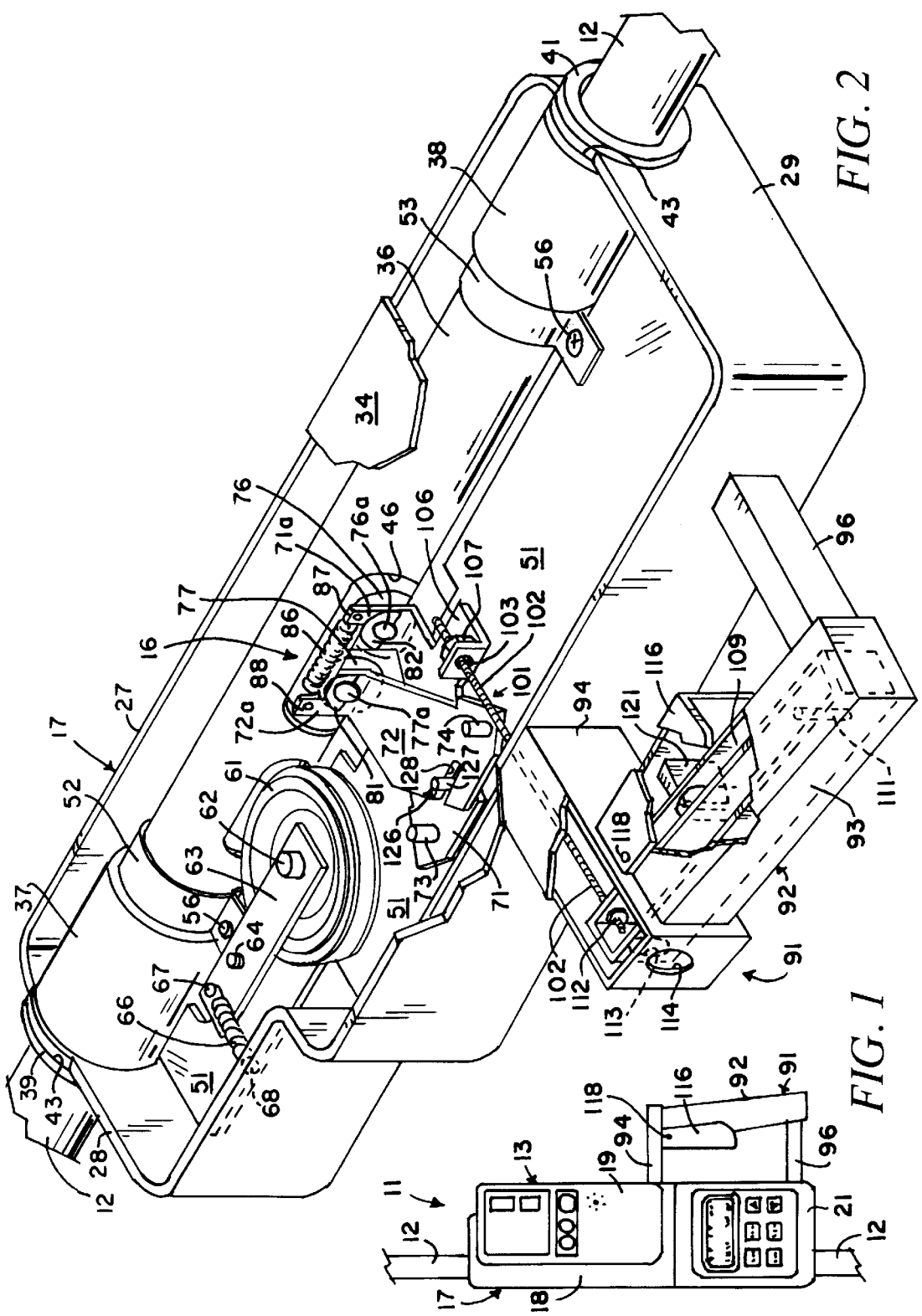

BRAKE MECHANISM FOR COMPUTERIZED GRADE ROD

This invention relates to a brake mechanism for a computerized grade rod which is used in conjunction with a laser level transmitter.

In U.S. Pat. Nos. 5,457,890 and 5,551,159, there is disclosed a computerized grade rod in the form of a scalable measuring apparatus and display device, system and method which incorporates the use of a brake mechanism. In use of this brake mechanism, it has been found that its performance degrades over time making it possible to lose its grip on the grade rod thereby creating inaccuracies in measurements. There is therefore a need for a new and improved brake mechanism for use with such a computerized grade rod.

In general, it is an object of the present invention to provide a brake mechanism for use with a computerized grade rod which retains its efficacy even after prolonged use.

Another object of the invention is to provide a brake mechanism of the above character which is mounted in a housing which receives the grade rod.

Another object of the invention is to provide a bi-polar over center brake mechanism of the above character in which first and second brake members are provided spaced longitudinally of the grade rod.

Another object of the invention is to provide a brake mechanism of the above character in which hand operated means is provided for operating the brake mechanism for movement between grade rod engaging and grade rod releasing positions.

Another object of the invention is to provide a brake mechanism of the above character in which one of the brake members prevents relative longitudinal movement on the grade rod in one direction and the other brake member prevents relative longitudinal movement in the opposite direction when the brake mechanism is in engagement.

Another object of the invention is to provide a brake mechanism of the above character which is relatively simple and inexpensive to produce.

Additional objects and features of the invention will appear from the following description in which the preferred embodiment is set forth in detail in conjunction with the accompanying drawings.

FIG. 1 is a partial front elevational view of a computerized grade rod incorporating the present invention and having a housing movable on the grade rod.

FIG. 2 is an isometric view showing the brake mechanism of the present invention the housing of the computerized grade rod.

In general, the brake mechanism of the present invention for use with a computerized grade rod is comprised of a housing containing a tunnel adapted to receive the grade rod and having it extend therethrough. A sensing wheel is mounted in the housing and functionally engages the outer surface of the grade rod and rotates as the housing ascends and descends the grade rod. A brake mechanism is carried by the housing and is adapted to engage the grade rod for retaining the housing in a predetermined elevational position with respect to the grade rod. The brake mechanism includes first and second spaced apart brake shoes spaced longitudinally of the grade rod. A mounting plate is carried by the housing. First and second arms carry respectively the first and second brake shoes. Each of the brake shoes has a center point. First and second spaced apart pivots pivotally mount the first and second arms on the mounting plate. The first and second pivots are positioned off center with respect to the center points of the first and second brake shoes. Yieldable means is provided for engaging the first and second arms for moving the first and second brake members into frictional engagement with the grade rod. Handle means is mounted on the housing and is coupled to the first and second arms for moving the first and second brake members out of engagement with the grade rod against the force of the yieldable means.

More in particular as shown in the drawings, the computerized grade rod 11 is generally of the type described in U.S. Pat. Nos. 5,457,890 and 5,551,159 which can be utilized for constructing flat, single slope and dual slope pads with any flat plane laser. The computerized grade rod 11 is comprised of a grade rod 12 and a controller 13 which gives a direct digital readout of cuts and fills and elevations. A new and improved brake mechanism 16 is provided as a part of the computerized grade rod 11 and is incorporated in a housing 17 of the controller 13 which can be formed of a suitable material such as plastic. The housing 17 is provided with a front wall 18 on which there is mounted components 19 and 21. The housing 17 is also provided with spaced apart parallel side walls 26 and 27, a top wall 28 and a bottom wall 29. The side walls 26 and 27 and the top wall 28 are formed to provide a recess 31 in the upper part of one side of the housing 17. The housing is also provided with a rear wall 34.

The housing 17 forms a part of the controller 13 and is provided means forming a tunnel adapted to receive the grade rod 12 and having it extend therethrough. The means forming the tunnel is in the form of a tube 36, as for example a length of ¾" Schedule 40 plastic irrigation tubing. Couplings 37 and 38 are mounted on opposite ends of the tube 36 and are secured thereto by a conventional adhesive. Flanged bushings 39 and 41 are mounted in the couplings 37 and 38 and provide annular spaces 42 and 43 between the couplings 37 and 38 and the flanges of the flanged bushings 39 and 41. The top and bottom walls 28 and 29 of the housing 17 have been provided with cutouts 44 which are sized to permit the housing to slip into the spaces 42 and 43 and to thereby retain the housing 17 in a longitudinally fixed position with respect to the tube 36 and adjacent the side wall 27. The tube 36 is provided with oval-shaped cutouts 46 and 47 within the housing facing the wall 26. The tube 36 and the flanged bushings 39 and 41 are sized so that the grade rod 12 can extend through the bushings 39 and 41 and so that the exterior surface of the tube 36 is exposed in the oval-shaped cutouts 46 and 47.

The brake mechanism 16 mounted within the housing consists of a mounting plate 51 formed of a suitable material such as aluminum having a thickness of 0.09". The mounting plate 51 is secured to the tube 36 within the housing 17 by spaced apart pipe clamps 52 and 53 which extend over the tube 36 and which are secured to the mounting plate 51 by bolts 56 to thereby support the mounting plate 51 so that the mounting plate 51 extends longitudinally of the plastic tube 36 and is offset to one side of the oval-shaped cutouts 46 and 47.

A tracking or sensing wheel 61 extends into the oval-shaped cutout 47 and is adapted to frictionally and tangentially engage the grade rod 12 to sense the movement of the housing 17 relative to the grade rod 12. The sensing wheel 61 is secured to a rotatable shaft 62 that is pivotally mounted on a swing arm 63. The swing arm 63 is pivotally mounted on a pin 64 mounted on the mounting plate 51 between the ends of the swing arm 63. The tracking or sensing wheel 61 is yieldably urged into the oval-shaped cutout 47 to frictionally engage the grade rod 12 by a spring 66 that has one end secured to a pin 67 carried by one end of the arm 63 opposite the end carrying the shaft 62 and the other end secured to a pin 68 secured to the mounting plate 51. The shaft 62 has mounted thereon a shaft encoder (not shown) which is utilized with the electronics disclosed in U.S. Pat. No. 5,457,890 to provide a digital readout of the movement of the housing 17 relative to the grade rod 12.

The brake mechanism 16 includes first and second arms 71 and 72 which also can be characterized as upper and lower arms 71 and 72. The first and second arms 71 and 72 are formed of a suitable material such as stainless steel to provide additional strength. The first arm 71 is pivotably mounted on a pin 73 mounted on the mounting plate 51 and the second arm 72 is pivotably mounted on a pin 74 also mounted on the mounting plate 51. As can be seen, the pivot pins 73 and 74 are spaced apart in a longitudinal direction parallel to the tube 36. First and second brake shoes or members 76 and 77 are provided which are carried respectively by the first and second arms 71 and 72. The brake members (not shown) can be formed of a suitable material such as rubber and can have a generally circular configuration with center points. The brake members 76 and 77 are provided with cylindrical extensions 76a and 77a which extend through holes 78 and 79 provided in right angle portions 71a and 72a of the first and second arms 71 and 72. Washers 81 and 82 formed of a suitable material such as Nylon and which have portions cut away are fitted around the extensions 76a and 77a to firmly retain the brake members 76 and 77 in the portions 71a and 72a.

Means is provided for yieldably urging the brake members 76 and 77 through the oval-shaped cutout 46 and into engagement with the exterior surface of the grade rod 12 and consists of a spring 86 which has opposite ends secured to ears 87 and 88 formed as a part of the first and second arms 71 and 72. Means is provided for moving the brake shoes or members 76 and 77 out of engagement with the grade rod 12 against the yieldable force provided by the spring 86 and consists of a handle mechanism 91 which include a handle 92. The handle 92 consists of the enclosure 93 that is rectangular in the cross section and which is mounted on support posts 94 and 96 secured to the housing 17 so that the enclosure 93 extends in a generally longitudinal direction generally parallel to the tube 36. The enclosure 93 and the support posts 94 and 96 can be formed a suitable material such as plastic.

The handle mechanism 91 also includes manually operable actuation means 101 for supplying a force to overcome the yieldable force provided by the spring 86 for removing the brake shoes 76 and 77 out of engagement with the grade rod 12 to permit the housing 17 to be moved upwardly or downwardly on the grade rod. This actuation means 101 consists of threaded rod 102 which has one end extending through a hole 103 in an ear 104 extending at right angles to a depending portion of 106 of the first arm 71. The threaded rod 102 is retained in a predetermined position in the hole 103 by a nut 107 threaded onto the rod 102.

The other end of the threaded rod 102 extends through a hole (not shown) provided in one end of a pivot arm 109. The pivot arm 109 is rectangular in cross section and extends longitudinally of the enclosure 93. The pivot arm 109 has its other end pivotally mounted in the enclosure 93 by a pivot pin 111. The threaded rod 102 is retained in a predetermined adjustable position with respect to the pivot arm 109 by an adjustment nut 112 threaded onto the rod. The adjustment nut 112 is accessible for adjustment through a hole 113 provided in the pivot arm 109 and through another hole 114 provided in the enclosure 93.

A trigger arm 116 which is U-shaped in cross section is pivotally mounted on a pin 118 mounted on the enclosure 93. The trigger arm 116 is accessible to the fingers of a human hand extending through a hand hole 119 provided between the housing 17 and the enclosure 93 and the support posts 94 and 96. The trigger arm 116 is provided with an outwardly extending projection 21 that extends through a hole 122 provided in the enclosure 93 permitting the projection 121 to engage the pivot arm 109 to cause movement of the pivot arm 109.

A pin-and-slot mechanism 126 is provided for causing coaction of the first and second arms 71 and 72 as arm 71 is moved. The pin-and-slot mechanism 126 consists of an upstanding pin 127 provided on the first arm 71 which extends into and is seated in an elongate rectangular slot 128 in the second arm 72 whereby movement of the first arm 71 causes movement of second arm handle mechanism 91 as the trigger arm 116 is actuated.

Operation and use of the brake mechanism for the computerized grade rod 11 may now be briefly described as follows. The computerized grade rod 11 is generally operated in which the housing 17 is moved up and down the grade rod 12 to move it to a desired position in making grade measurements. With the trigger arm 116 released, the brake shoes or members 76 and 77 will yieldably engage the grade rod 12 to retain the housing 17 in the desired vertical or longitudinal position with respect to the grade rod 12. The brake mechanism 16 can be characterized as a bipolar over center brake mechanism which serves to ensure that the housing 17 remains in a predetermined position after the brake mechanism 16 has been released and is retained in engagement by the yieldable means in the form of the spring 36.

From this arrangement it can be seen that when there is any attempt by the housing 17 to move downwardly with respect to the grade rod 12 as shown in FIG. 2, the brake shoe 77 will be pushed inwardly with greater force against the grade rod 12 since the center point of the brake shoe 77 is positioned over or off center of the pivot pin 74 to thereby wedge the housing 17 against the grade rod 12. Similarly if there is an attempt for the housing 17 to move upwardly with respect to the grade rod 12, the brake member or shoe 76 will also be pushed inwardly against the grade rod 12 because the center point of the brake shoe is over or off center of the pivot pin 73 to thereby also provide a wedging action wedging the housing 17 against the grade rod 12 to prevent upward movement of the housing 17 which respect to the grade rod 12.

This positioning of the brake members 76 and 77 so that they are over center with respect to the respective pivots 73 and 74 is very advantageous because it serves to lock the housing 17 in a predetermined position with respect to the grade rod 12 preventing movement in either of two opposite directions longitudinally of the grade rod 12. Thus even if there may be some wear on the brake shoes or members 76 and 77 and the grade rod 12, the brake shoes 76 and 77 still will be efficacious in preventing movement of the housing 17 with respect to the grade rod 12 when the brake members or shoes 76 and 77 are engagement with the grade rod 12.

When it is desired to removed the housing 17 relative to the grade rod 12, it is merely necessary to insert a hand into the hand hole 119 and engage the trigger arm 116 and its cover plate 117 with one or more fingers of the hand and move the trigger arm 116 towards the enclosure 93 to cause the projection of the trigger arm 121 to engage the pivot arm 109 to cause movement of the threaded rod 102 in the housing 17 to move the first arm 71 and the brake shoe 76 out of engagement with the grade rod 12 against the yieldable force provided by the spring 86. At the same time as this is occurring, the pin 127 carried by the first arm 71 disposed in the slot 128 causes corresponding movement of the second arm 72 to remove the brake member or shoe 77 out of engagement with the grade rod 12 to permit the housing 17 to be raised and lowered in accordance with the desires of the operator carrying out the grading operation. As soon as the desired elevation has been reached by the housing 17, the trigger arm 116 can be released permitting the spring 86 to exert a yieldable force to bring the brake shoes or members 76 and 77 into engagement with the grade rod 12 to retain the housing 17 in the desired elevational position on the grade rod 12. Because of the over-center mounting of the brake members or shoes 76 and 77 as hereinbefore described, the housing 17 is retained in the desired position on the grade rod 12 and will not move vertically or longitudinally with respect to the grade rod 12.

The desired clearances for ensuring that the brake shoes or members 76 and 77 will be moved out of engagement with the grade rod 12 upon operation of the trigger arm 116 can be readily obtained merely by adjusting the position of the adjustment nut 112 on the threaded rod 102 by an appropriate tool through the access holes 113 and 114.

From the foregoing it can be seen that there has been disclosed a brake mechanism for use with a computerized grade rod by which because of its bipolar over center mounting ensures that the housing will always be retained in the desired position on the grade rod without slippage thereby ensuring that accurate grade measurements are being made by the computerized grade rod 11. As disclosed, it can be seen that the braking mechanism of the present invention is relatively simple in construction and can withstand prolonged use and wear without affecting efficacy of the brake mechanism. In addition, the brake mechanism can be constructed very economically and can be readily incorporated in the housing.

What is claimed:

1. A brake mechanism for use with a computerized grade rod comprising a housing containing a tunnel adapted to receive the grade rod and having the grade rod extend therethrough, a sensing wheel mounted on the housing and tangentially engaging the outer surface of the grade rod and rotating as the housing ascends and descends the grade rod, brake means carried by the housing and adapted to engage the grade rod to retain the housing in a predetermined longitudinal position with respect to the grade rod, said brake means including first and second spaced apart brake pair shoes spaced apart longitudinally of the grade rod, a mounting plate carried by the housing, first and second arms carrying respectively the first and the second brake shoes, each of the said brake shoes having a center point, first and second spaced apart pivot pins pivotally mounting said first and second arms on said mounting plate, said first and second pivot pins being positioned off center with respect to the center points of the first and the second brake shoes, yieldable means secured to the first and second arms for urging the first and second brake shoes into frictional engagement with the grade rod and handle means mounted on the housing and coupled to the first and second arms for moving the first and second brake shoes out of engagement with the grade rod against the force of the yieldable means.

2. A brake mechanism as in claim 1 wherein the handle means includes means secured to one of the said first and second arms for causing movement of said one arm and interconnecting means carried by said first and second arms for interconnecting said first and second arms whereby when said one arm is moved, the other arm is moved.

3. A brake mechanism as in claim 1 wherein said interconnecting means is comprised of a pin-and-slot connection in which a slot is provided in one of the said first and second arms and wherein a pin is carried by the other of said first and second arms and is disposed in said slot.

4. A brake mechanism as in claim 1 in which the pivot point for the first arm is positioned above the center point of the first brake shoe and the pivot point for the second arm is positioned on the mounting plate below the center point for the second brake shoe.

5. A brake mechanism as in claim 1 wherein said handle means includes adjustment means for adjusting the amount of movement of the first member for moving the brake shoe carried by the first member out of engagement with the grade rod upon operation of the handle means.

6. A brake mechanism as in claim 5 wherein said adjustment means includes a threaded rod and a nut threaded on the threaded rod.

7. A brake mechanism as in claim 6 wherein said the handle means mechanism includes a trigger arm for causing movement of said brake shoes out of engagement with the grade rod.

* * * * *